Feb. 9, 1960 P. J. H. JANSSEN 2,924,745
LINE DEFLECTION CIRCUIT IN TELEVISION RECEIVERS
Filed Dec. 17, 1956 2 Sheets-Sheet 1

INVENTOR
PETER JOHANNES HUBERTUS JANSSEN
BY
AGENT

Feb. 9, 1960 P. J. H. JANSSEN 2,924,745

LINE DEFLECTION CIRCUIT IN TELEVISION RECEIVERS

Filed Dec. 17, 1956 2 Sheets-Sheet 2

INVENTOR
PETER JOHANNES HUBERTUS JANSSEN

BY Frank R. Jufani
AGENT

United States Patent Office 2,924,745

Patented Feb. 9, 1960

2,924,745

LINE DEFLECTION CIRCUIT IN TELEVISION RECEIVERS

Peter Johannes Hubertus Janssen, Eindhoven, Netherlands, assignor, by mesne assignments, to North American Philips Company, Inc., New York, N.Y., a corporation of Delaware Application December 17, 1956, Serial No. 628,744

Claims priority, application Netherlands February 15, 1956

6 Claims. (Cl. 315—27)

The invention relates to a line deflection circuit in a television receiver, which circuit contains a tube the anode circuit of which is coupled, through a transformer, to the line deflector coils, the anode direct current passing through part of a winding of the transformer, provision being made of means for compensating the bias magnetisation of the transformer core produced by this direct current.

It is well known to counteract the direct current bias magnetisation of the transformer core by causing the anode direct current passing through a number of turns of the transformer to traverse an equal number of turns in another winding part of the transformer in the reverse magnetizing sense. As this other winding part, use is frequently made of the winding to which the line deflector coils are connected. In this arrangement, provision must be made of means preventing a considerable part of the alternating current energy intended for the line deflector coils from being absorbed by the direct current connection to the associated circuit. In a known circuit arrangement, the anode direct current is supplied to the deflection circuit through the coil of the amplitude control which is connected in parallel with the line deflector coils and with the associated transformer winding. The use of such a parallel coil has a limitation in that, even at the maximum amplitude position, an appreciable part of the reactive energy circulates in this coil. If for this reason the parallel coil is omitted, the demagnetisation of the core cannot be effected in this manner. It is true that the anode direct current can be supplied in this event to the desired transformer winding by way of a separate large alternating current blocking coil having sufficient inductance, however, this solution is comparatively expensive.

The circuit arrangement in accordance with the invention obviates this disadvantage and is characterized in that a number of turns of the transformer are included in the smoothing circuit of the direct voltage supply circuit of the receiver.

In order that the invention may readily be carried out, two embodiments thereof will now be described, by way of example, with reference to the accompanying diagrammatic drawings, in which.

Figure 1:
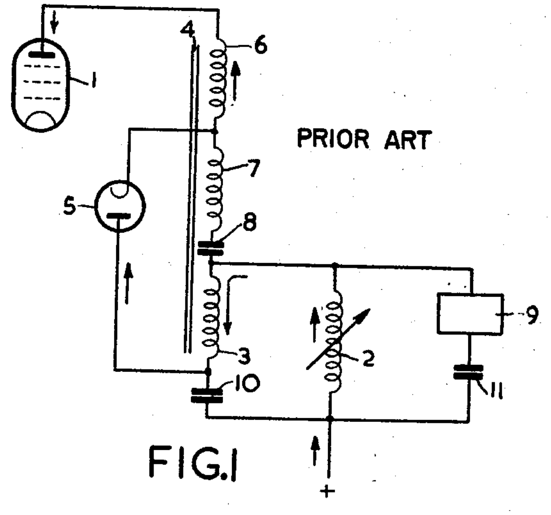
Fig. 1 shows a known circuit arrangement.

In the circuit arrangement shown in Fig. 1, the anode direct current flows, in the direction indicated by arrows, through the circuit to the anode of a tube 1 which forms part of the line deflection circuit. This current passes in sequence through a coil 2 of the amplitude control, a winding 3 of a transformer 4, a series power feedback diode 5, a winding 6 of the transformer 4 and subsequently to the anode of the tube 1. The numbers of turns of the transformer windings 3 and 6 are substantially equal, so that the direct current magnetisation of one winding is substantially cancelled by that of the other winding. The diode 5 in known manner shunts the transformer windings 3 and 7 which are separated from one another by a capacitor 8 across which in known manner the booster direct voltage is produced. The coil 2 of the amplitude control and line deflector coils 9 are connected in parallel with the transformer winding 3; direct current blocking capacitors 10 and 11 are also connected in this circuit.

Part of the line deflection energy supplied by the winding 3 will invariably circulate in the coil 2.

Figure 2:
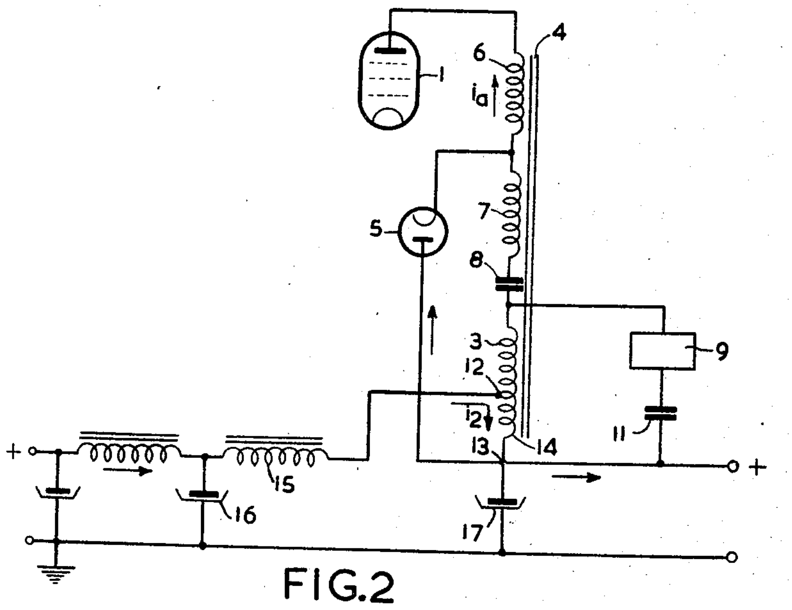
Fig. 2 shows an embodiment of the circuit arrangement in accordance with the invention in which the transformer is an autotransformer.

The circuit arrangement shown in Fig. 2 obviates this disadvantage.

In this circuit arrangement, the anode of the tube 1 is connected in known manner, through the winding 6 of the transformer 4 and the diode 5, to the positive supply voltage. The manner in which the anode of the diode 5 is connected to the positive voltage supply is not of importance for the present invention. The transformer further comprises the windings 7 and 3 which are separated from one another by the capacitor 8. The series combination of the deflector coils 9 and the direct current blocking capacitor 11 is connected in parallel with the transformer winding 3. In this circuit arrangement, a part 14 of the transformer winding 3 between points 12 and 13 is connected in series with a choke coil 15 of a series branch of the smoothing circuit of the direct voltage supply circuit of the receiver so that the direct current $i_2$, which passes through this series branch of the smoothing circuit and hence through the winding part 14 of the transformer 4, produces a magnetisation in the transformer core which substantially counteracts the magnetisation produced in the winding 6 by the anode current $i_a$ of the tube 1. If, for example, the winding 6 has $n_1$ turns and the winding part 14 $n_2$ turns, $i_a n_1$ should be substantially equal to $i_2 n_2$. If the circuit contains any further direct current circuits which might produce a bias magnetisation of the core, allowance must obviously be made for these circuits. At the beginning and at the end of the said series branch of the smoothing circuit, smoothing capacitors 16 and 17, respectively, are connected in known manner. The circuit arrangement described permits of ensuring demagnetisation of the transformer core without an appreciable part of the line deflection energy being lost in the demagnetisation circuit and without a separated core of large inductance being required as a direct current blocking element.

Figure 4:
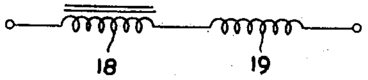
Fig. 4 is an equivalent circuit of a choke coil.

The invention is based on recognition of the fact that the choke coil of the smoothing circuit can be represented electrically by a series combination of an inductance 18 having an iron core and a leakage inductance 19 which is not coupled to the iron, as is shown in Fig. 4. With respect to the line frequency the leakage inductance 19 is so large that substantially the entire alternating voltage is set up across it and losses of line frequency energy in the iron of the choke coil are negligible. The invention further is based on recognition of the fact that any disturbance of the supply frequency across the deflector coils is completely negligible. It was found in practice that the amplitude of the supply frequency ripple voltage across the choke coil 15 is about 1% of the amplitude of the direct voltage across this coil. In addition, the capacitor 11 offers so large an impedance to the supply frequency that the deflector coils 9 are not perceptibly subjected to disturbance produced by this supply frequency ripple.

Figure 3:
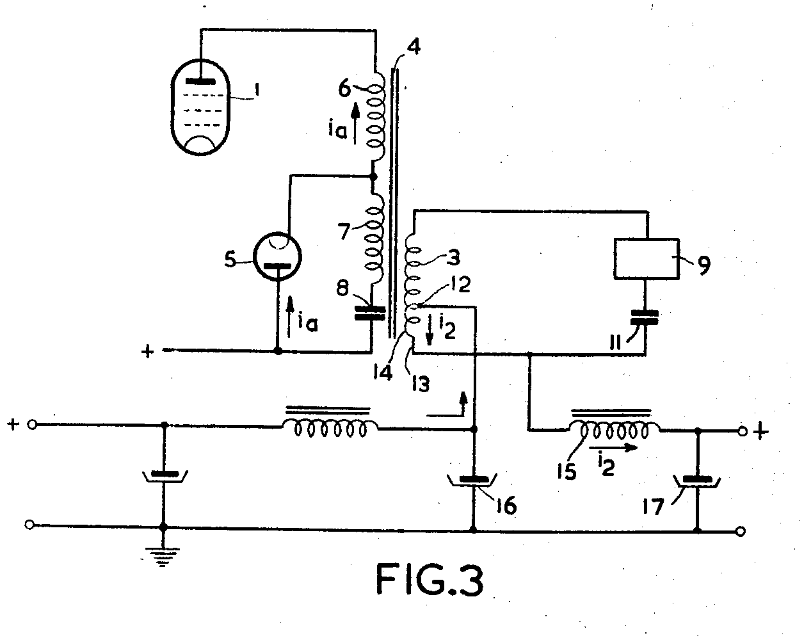
Fig. 3 shows an alternative embodiment of the circuit arrangement in accordance with the invention in which the transformer contains at least two separate windings.

Fig. 3 shows an alternative embodiment of the circuit arrangement in accordance with the invention, in which he transformer is not an auto-transformer. The various components of the circuit arrangement are designated y reference numerals corresponding to those of the omponents of Fig. 2 and of Fig. 1, the circuit arrangenent shown in Fig. 3 operating similarly to that of Fig. , so that it need not be described in detail.

For the sake of completeness it should be mentioned hat it is not of importance for the invention whether he deflection circuit includes a series power feedback iode or a parallel power feedback diode, a damping iode or no diode at all; the invention can be applied o all these embodiments. Neither is it necessary to use s the demagnetisation winding a part of the transformer vinding to which the deflector coils are connected. The onnection of another winding or winding part of the ransformer in the smoothing circuit permits of achieving he same desired result.

What is claimed is:

1. A television receiver comprising a source of direct oltage and receiver circuits including a deflection cir-uit, said deflection circuit comprising an output tube aving an anode, an output transformer having a primary vinding and a secondary winding, a deflection coil conected to said secondary winding, means connecting said rimary winding between said anode and said source of irect voltage whereby anode current flowing in said rimary winding tends to cause bias magnetization of said ransformer, and bias magnetization compensating means omprising means connecting a portion of one of said vindings between said source of direct voltage and a lurality of said receiver circuits whereby current flow n said portion of a winding tends to cause a magnetizaion of said transformer in opposition to said bias magetization, the ampere-turns product of said portion of winding being substantially equal to the ampere-turns roduct of said primary winding.

2. A television receiver as claimed in claim 1, in which said secondary winding has a tap thereon connected to said source of direct voltage, and means connecting an end of said secondary winding to said plurality of receiver circuits.

3. A receiver as claimed in claim 1, in which said transformer is an auto-transformer, said secondary winding having a tap thereon connected to said source of direct voltage, and means connecting an end of said secondary winding to said plurality of receiver circuits.

4. A receiver as claimed in claim 3, in which said deflection circuit is included in said plurality of receiver circuits.

5. A receiver as claimed in claim 1, in which said primary and secondary windings are electrically isolated from one another, said secondary winding having a tap thereon connected to said source of direct voltage, and means connecting an end of said secondary winding to said plurality of receiver circuits.

6. A receiver as claimed in claim 5, in which said deflection circuit is excluded from said plurality of receiver circuits.

References Cited in the file of this patent

UNITED STATES PATENTS

| | | |
|---|---|---|
| 2,536,839 | Clark et al. | Jan. 2, 1951 |
| 2,543,305 | Schwarz | Feb. 27, 1951 |
| 2,599,798 | Wissel | June 10, 1952 |
| 2,658,163 | De Cola | Nov. 3, 1953 |
| 2,665,393 | Bocciarelli | Jan. 5, 1954 |
| 2,693,549 | Vonderschmitt | Nov. 2, 1954 |
| 2,713,652 | Baylor | July 19, 1955 |
| 2,743,381 | Dietch | Apr. 24, 1956 |
| 2,780,749 | Dietch | Feb. 5, 1957 |
| 2,814,759 | Vonderschmitt | Nov. 26, 1957 |